United States Patent Office 2,770,920
Patented Nov. 20, 1956

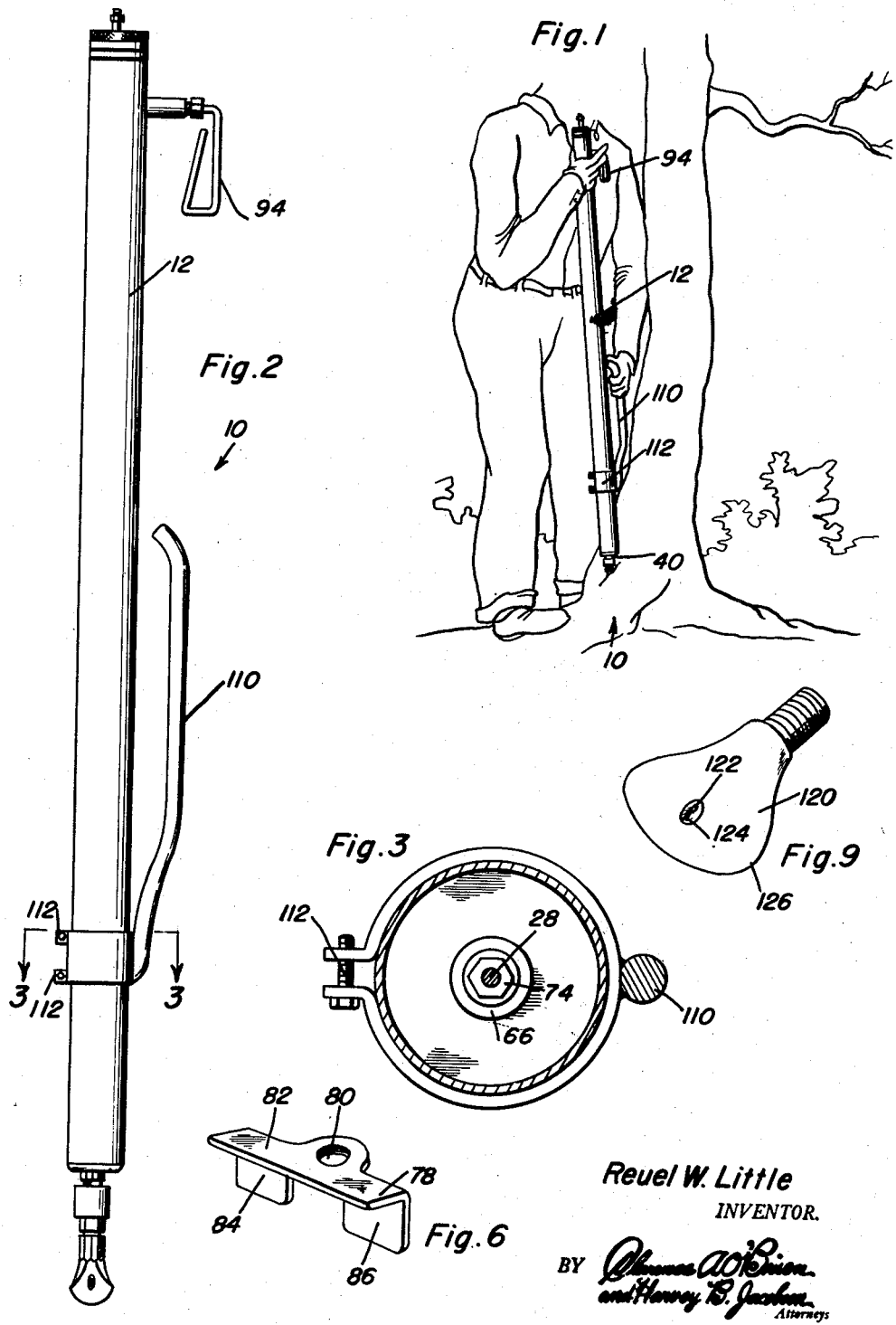

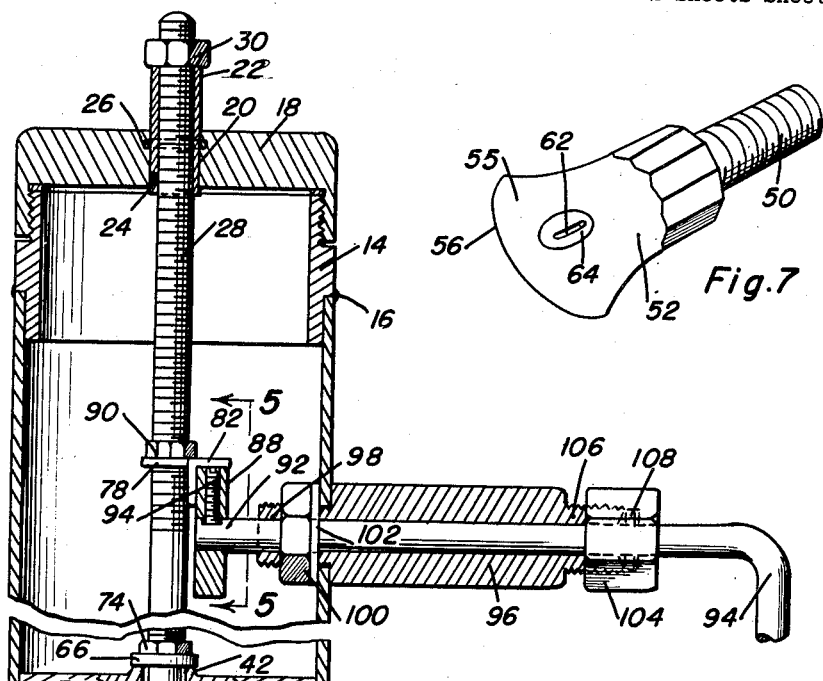
Fig. 4
Fig. 7
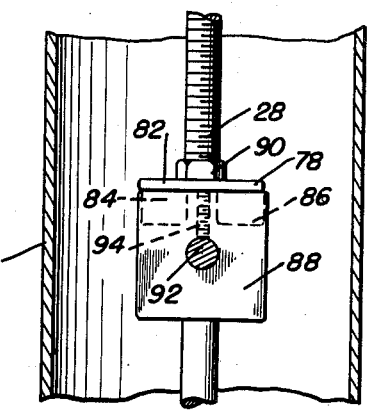
Fig. 5
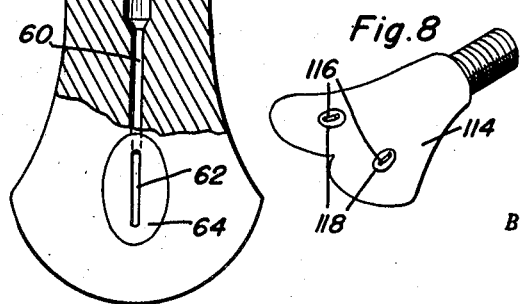
Fig. 8
Reuel W. Little
INVENTOR.

2,770,920

TREE INOCULATOR

Reuel W. Little, Madill, Okla.

Application July 26, 1954, Serial No. 445,845

9 Claims. (Cl. 47—57.5)

This invention relates to a novel tree injector and more particularly to an implement which is charged with suitable fluid chemical, such as may be determined to be required, and which is used in a manner to keep the tree alive and make it grow, or to deaden and kill the tree, as the case may be.

As is well known, the clearing of land is usually a considerable task. Trees are burned and the land is generally put into cultivation and in the years that follow additional time and effort must be expended in cutting the sprouts that rise from the root systems of the trees. It is therefore the primary object of this invention to provide means for killing the entire tree including the root system so as to prevent further sprouting of the tree after the land has been cleared.

A further object of the invention resides in the provision of a tree deadener which may be used to easily and quickly inject and deposit a suitable amount of fluid beneath the outer bark of the tree and into a pocket formed by the tree deadener in the inner bark of the tree. A plant hormone or the like is generally applied so as to cause the tree to grow itself to death. However, substance poisonous to the tree may be utilized as desired.

The invention may also be utilized in the care and treatment of trees so that trees which may be dificient in certain food elements may be supplied with suitable amounts thereof and substances of medicinal value to the tree may be easily injected therein.

The structure of this invention features an elongated barrel of considerable length though light in weight to which a valve body and a blade are adjustably attached. A novel valve mechanism is provided for permitting flow of fluid from the barrel through an aperture in the blade.

Still further objects and features of this invention reside in the provision of a tree deadener that is strong and durable, which may be used even though there is extensive underbrush to perform its tasks, which is highly efficient in operation, yet inexpensive to manufacture and time-saving in its utilization.

These, together with the various ancillary objects and features of the invention which will become apparent as the following description proceeds, are attained by this tree deadener, a preferred embodiment of which has been illustrated in the accompanying drawings, by way of example only, wherein:

Figure 1 is a pictorial view illustrating the invention in use;

Figure 2 is an elevational view of the tree deadener;

Figure 3 is a horizontal sectional view as taken along the plane of line 3—3 in Figure 2 and being shown in an enlarged scale;

Figure 4 is an enlarged longitudinal sectional view of the tree deadener;

Figure 5 is a vertical sectional view as taken along the plane of line 5—5 in Figure 4;

Figure 6 is a perspective view of the valve lifter foot adapted to be attached to the valve rod for use in lifting the valve rod;

Figures 7 through 9 are perspective views of several forms of blades capable of being utilized as elements of the present invention.

With continuing reference to the accompanying drawings wherein like reference numerals designate similar parts throughout the various views, reference numeral 10 generally designates the tree deadener comprising the present invention. This tree deadener includes an elongated tube 12 providing a barrel which is formed of comparatively light weight and thin wall metal. The tube 12 has an externally threaded hood section 14 welded as at 16 or otherwise secured at the upper end thereof to which a vent cap 18 is threadedly secured.

Extending through an aperture 20 in the cap 18 is a vent sleeve 22 which has a longitudinally extending aperture therethrough as well as an opening 24. The vent sleeve is held in place by means of a lock ring 26 and an elongated valve rod 28 extends through the vent sleeve 22. A nut 30 is threadedly adjustably secured on the upper end of the valve rod 28.

The lower end of the barrel or tube 12 is formed with a lower end member 32 welded as at 34 to the tube 12 and has an internally threaded aperture 36 therethrough for reception of the threaded end 38 of a valve body 40. The valve body 40 is provided with a substantially truncated conical valve seat 42 at the upper end thereof through with an aperture 44 extends, the aperture opening into a recess 46 which further communicates with a recess 48 in the threaded upper end 50 of a blade 52 which is threadedly received in the internally threaded lower portion of the valve body 40. A lock nut 54 is used to adjustably lockingly hold the blade 52 in a selected angular position.

The blade 52 whose construction can be more clearly seen in Figure 7 has an outwardly flared lower portion 55 terminating in an arcuate axe-like cutting edge 56 and has an inner recess 58 in communication with the recess 48 and with an aperture 60 which extends through to the outer surfaces of the blade, as at 62. A cavity 64 is provided adjacent each of the apertures 62 thus permitting more efficient flow of fluid.

In order to control the flow and discharge of fluid from the barrel 12, the valve rod 28 is provided with a suitable valve member 66 which is normally urged into engagement in overlying relationship relative to the valve seat 42 by a coil spring 68 mounted within the recess 46 and engaging the wall 70 of the valve body 40 and a nut 72 forming a stop which is threadedly secured on the end of the valve rod in an adjustable manner to thereby control the stress on the spring 68. Further the valve member 66 is adjustably held in position by means of a nut 74 and a nut 76 is threadedly secured on the externally threaded portion 38 of the valve body 40 to lockingly hold the valve body 40 in its adjusted position.

Threadedly secured on the upper end of the valve rod 28 is a valve lifter foot 78 the construction of which can be best seen in Figure 6. This valve lifter foot 78 includes an internally threaded aperture 80 and an upper platform portion 82 as well as downwardly depending flange portions 84 and 86. The flange portions 84 and 86 form limit guides for a cam 88 which is adapted to engage the undersurface of the platform 82. A lock nut 90 is provided for adjustably holding the valve lifter foot 78 in its selected position.

The cam 80 which is substantially square in shape is secured to a shaft 92 by means of a setscrew 94. The shaft 92 extends through the side walls of the barrel 12 and terminates in a handle 94 used for rotating the shaft 92 and hence the cam 88. A shaft mounting member 96 is provided having an externally threaded inner portion 98 extending through the side walls of the barrel 12 and a nut 100 is threadedly received thereon holding a gasket 102 in position. Further, a cap nut 104 is threadedly received on the externally threaded outer end 106 of the shaft mounting member 96 and holds packing 108 in position.

Attached to the lower end of the barrel 12 in an adjustable manner is a guide rod 110 which is vertically slidably clamped as at 112 about the barrel 12.

In Figure 8 there is shown another form of blade generally indicated by reference numeral 114 which includes a plurality of apertures 116 as well as a plurality of concaved or scooped portions 118 in alignment with the apertures 116 thereby permitting fluid to flow through a plurality of passages and into the concavity formed by the blade in the inner bark of the tree. Likewise, in Figure 9, there is shown a further modification of the blade 120 which is provided with an aperture 122 therethrough as well as a concave portion 124. However, in this form of the invention the outwardly flared portions are rounded as at 126.

In operation, and as is shown in Figure 1, the tree deadener is thrust into the base of the tree at an angle of about 5° from the vertical. This forces the knife point to pierce the inner bark of the tree and make a small indentation or pocket therein. It is to be recognized that the knife blade can be rotated as may be most convenient for the user of the invention. When this is done, rotation of the handle 94 will cause the valve rod 28 to rise and permit low fluid from the valve 12 through the apertures as at 62, and into the pocket in the inner bark of the tree. This fluid will then either kill or treat the tree dependent upon the use of the tree deadener.

From the foregoing, the construction and operation of the device will be readily understood and further explanation is believed to be necessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A tree deadener comprising an elongated barrel, a valve body secured to the lower end of said barrel in communication therewith, said valve body having a valve seat at the upper end thereof and having a recess therein terminating at an upper wall of said valve body, a bark penetrating blade attached to said valve body, a valve rod extending through said barrel and said valve body, a valve disc member adjustably secured on said valve rod and adapted to seat on said valve seat, means extending normal to said barrel and outwardly thereof for raising said valve rod to raise said valve disc off from said valve seat, said means including a valve lifter foot secured to said valve rod, a shaft rotatably mounted in said barrel, and a cam attached to said shaft engaging said valve lifter foot to raise said valve rod upon rotation of said shaft, said valve rod having resilient means mounted concentrically thereon for urging said valve rod to a position wherein said valve disc member is seated on said valve seat, said resilient means being received said recess and yielding engaging said upper wall.

2. A tree deadener comprising an elongated barrel, a valve body secured to the lower end of said barrel in communication therewith, said valve body having a valve seat at the upper end thereof, a bark penetrating blade attached to said valve body, a valve rod extending through said barrel and said valve body, a valve disc member adjustably secured on said valve rod and adapted to seat on said valve seat, means extending normal to said barrel and outwardly thereof for raising said valve rod to raise said valve disc member off from said valve seat, said means including a valve lifter foot secured to said valve rod, a shaft rotatably mounted in said barrel, and a cam attached to said shaft engaging said valve lifter foot to raise said valve rod upon rotation of said shaft, said blade being flared outwardly and downwardly to form a pocket in the bark of a tree when inserted, said blade having at least one aperture therethrough in communication with said valve body and said barrel, said blade having a scooped depression therein in alignment with said aperture.

3. A tree deadener comprising an elongated barrel, a valve body secured to the lower end of said barrel in communication therewith, said valve body having a valve seat at the upper end thereof, a bark penetrating blade attached to said valve body, a valve rod extending through said barrel and said valve body, a valve disc member adjustably secured on said valve rod and adapted to seat on said valve seat, means extending normal to said barrel and outwardly thereof for raising said valve rod to raise said valve disc member off from said valve seat, said means including a valve lifter foot secured to said valve rod, a shaft rotatably mounted in said barrel, a cam attached to said shaft engaging said valve lifter foot to raise said valve rod upon rotation of said shaft, said valve rod having resilient means mounted concentrically thereon for urging said valve rod to a position wherein said valve disc member is seated on said valve seat, said blade being flared outwardly and downwardly to form a pocket in the bark of a tree when inserted, said blade having at least one aperture therethrough in communication with said valve body and said barrel, said blade having a scooped depression therein in alignment with said aperture, and a guide handle clampingly adjustable secured to said barrel.

4. A tree deadener comprising an elongated barrel, a valve body secured to the lower end of said barrel in communication therewith, said valve body having a valve seat at the upper end thereof and having a recess therein terminating at an upper wall of said valve body, a bark penetrating blade attached to said valve body, a valve rod extending through said barrel and said valve body, a valve disc member adjustably secured on said valve rod and adapted to seat on said valve seat, and means extending normal to said barrel and outwardly thereof for raising said valve rod to raise said valve disc member off from said valve seat, said valve rod having resilient means mounted concentrically thereon for urging said valve rod to a position wherein said valve disc member is seated on said valve seat, said resilient means being received in said recess and yieldingly engaging said upper wall.

5. A tree injector comprising a bark cleaving and penetrating blade feathered, sharpened, and accurately curved at its leading end, broad and fantail-shaped in plan and defining a cutting edge similar to the cutting edge of an axe, said cutting edge being such that it may be swiftly heaved toward and forcibly plunged into a selected spot at the base of a given tree, a rigid one-piece vertically elongated barrel of a length and a pre-requisite weight to sink the blade and to cause it to penetrate the outer bark, cleave through and beyond the cambium layer and to condition said spot for injection, said barrel and blade providing the weight needed to permit the user to impart the intended impetus and to vigorously drive the blade home, said barrel also, because of its length, constituting a reach member and, in addition, serving as a portable reservoir for a fluid chemical, a normally closed dispensing valve at the lower end of said barrel, coupling means independent of said barrel and blade and separately joined to the end of the barrel and joining said valved lower end to an upper end portion of said blade, said blade and coupling means having axial passage means for gravitation of the fluid chemical from the reservoir to the blade, the lower discharge end of said passage means opening through a discharge port provided therefor at the median portion of a front surface of said blade, remote control finger actuated trip means for the valve mounted accessibly on one side of the upper portion of said barrel adapted to be operated just as soon as the blade has been driven home, and piloting and handle means adjustably mounted on the leading lower half-portion of said barrel and laterally offset and serving to enable the user to aim, guide, drive and land the cutting edge of the blade at the spot which is to be penetrated and injected with the fluid chemical.

6. The structure defined in claim 5 and wherein said blade is relatively wide in a lengthwise direction, is gradually increased in thickness from its leading toward its trailing end and is thus like a wood splitting wedge, whereby to effectually cleave the fibers of the tree trunk, said front surface being concave and thus dished, whereby to not only cleave its way but to act on the fibers in a manner to define a pocket between said dished side and the fibers, that is, a momentarily unobstructed pocket into which the fluid chemical is emptied and allowed to settle until absorbed and taken up by the fibers and circulating sap.

7. The structure defined in claim 6 and wherein the discharge end of said passage means is fashioned into a fluid pooling cavity, the latter situated at the central areal portion of said front surface, said cavity being of ovate form and wider than the diameter of the adjacent discharge end portion of said passage means.

8. A tree injector comprising a bark cleaving blade having a wedge-like body portion provided with a fluid passage, an arcuately curved leading knife-like edge, and front and back sides, said front side being dished and having a centralized fluid pooling cavity, and the discharge end of said passage communicating with and emptying into said cavity, a bored body separate from said blade and having a dispensing valve and separably coupled to the trailing end of the body portion of said blade and adapted, when the valve therein is open, to provide for delivery of a prescribed charge of fluid chemical into said passage for gravitation into said cavity, a one-piece vertically elongated barrel separably but communicatively joined at its lower end with the upper end of said bored body and adapted to contain the fluid chemical for injection into the fibers of the tree, said blade, bored body and barrel being conjointly possessed of a predetermined amount of weight, an amount which is ample to permit the user of the injector to literally "throw" the injector, while still holding it, toward a selected spot at the base of a tree in a manner to forcibly land and drive the blade through the outer bark and into the cambium layer and to thus cleave a pocket into which a prescribed amount of the fluid chemical fed into said cavity is deposited to impregnate the tree, remote control trip means for the valve mounted accessibly on one side of the upper portion of said barrel, upper handle means fixed on said one side and situated downwardly from the top of the barrel and adapted to accommodate the right hand of the user, and lower handle means for the left hand mounted on the lower half-portion of said barrel just above the blade and designed and serving to enable the user to aim, guide and forcibly land the blade at the spot which is to be penetrated and injected.

9. A tree injector comprising a rigid one-piece elongate barrel of a length to provide the necessary reach for use by a man of average height while standing up, the necessary length while it is being lifted and then vigorously plunged forwardly and downwardly at the requisite angle of tilt in the direction of the base of the tree, and of a weight that it is neither too light nor too heavy for its intended ram-like driving stroke, an axially bored body removably mounted on the leading end of said barrel, provided at its upper end with a valve seat and serving as a coupling, a heavy wedge-type bark cleaving, pocket-forming and pocket-prying blade provided at its leading end with an arcuately curved relatively broad axe-like cutting edge, said blade being axially bored with the discharge end opening through a dished front surface of the blade and aligned with the bore in said bored body, a valve rod slidable through the valve seat and having a spring-biased lower end confined in the bore of said bored body, and an intermediate and upper portion extending up and into said barrel, a valve member adjustably carried by said rod and normally engaging said seat, a rocker shaft mounted on and disposed at right angles to said barrel having an inner oscillatable end portion projecting into the barrel and operatively cooperating with the rod to lift said rod and open the valve member and having an outer end portion provided with a finger actuated trip for the right hand of the user, and a piloting handle adjustably mounted on the leading lower half-portion of said barrel and serving to assist the user in a manner to accurately aim, drive and forcibly land the cutting edge of the blade at the intended penetrable spot at the base of said tree.

References Cited in the file of this patent

UNITED STATES PATENTS

| | | |
|---|---|---|
| 433,849 | Burbeck | Aug. 5, 1890 |
| 887,275 | Rumpel | May 12, 1908 |
| 1,407,689 | Batterson | Feb. 28, 1922 |
| 2,687,598 | Calhoun | Aug. 31, 1954 |

FOREIGN PATENTS

| | | |
|---|---|---|
| 96,554 | Austria | Apr. 10, 1924 |
| 8,462 | Australia | of 1913 |
| 28,808 | Australia | of 1930 |
| 708,127 | France | Apr. 27, 1931 |
| 824,277 | Germany | Dec. 10, 1951 |

OTHER REFERENCES

Cope et al.: "The Killing of Trees With Sodium Arsenite," published May 1931 in Journal of Forestry, vol. 29, No. 5, pp. 775–783.